United States Patent [19]

Hall

[11] Patent Number: 5,046,370
[45] Date of Patent: * Sep. 10, 1991

[54] FLOW METER WITH IMPROVED TURBINE BLADES

[75] Inventor: Robert E. Hall, Wichita, Kans.

[73] Assignee: Great Plains Industries Inc., Wichita, Kans.

[*] Notice: The portion of the term of this patent subsequent to Aug. 15, 2006 has been disclaimed.

[21] Appl. No.: 389,275

[22] Filed: Aug. 2, 1989

Related U.S. Application Data

[63] Continuation-in-part of Ser. No. 99,132, Sep. 21, 1987, Pat. No. 4,856,348, and a continuation-in-part of Ser. No. 826,297, Feb. 5, 1986, Pat. No. 4,700,579, and a continuation-in-part of Ser. No. 553,793, Nov. 21, 1983, abandoned.

[51] Int. Cl.$^5$ .............................................. G01F 1/10
[52] U.S. Cl. ................................ 73/861.89; 73/272 R; 416/243
[58] Field of Search ..................... 73/861.77, 861.78, 861.83–861.94, 73/272 R; 416/242, 243, DIG. 2

[56] References Cited

U.S. PATENT DOCUMENTS

| | | | |
|---|---|---|---|
| 128,338 | 6/1872 | Van Anden. | |
| 1,719,415 | 7/1929 | Back | 416/243 |
| 2,524,870 | 10/1950 | Adamtchik | 103/115 |
| 2,770,131 | 11/1956 | Sparling | 73/231 |
| 3,084,545 | 4/1963 | Waugh | 73/231 |
| 3,238,776 | 3/1966 | Potter | 73/231 |
| 3,329,021 | 7/1967 | Quesinberry et al. | 73/229 |
| 3,332,500 | 7/1967 | Bristol et al. | 416/243 |
| 3,370,465 | 2/1968 | Belle | 73/230 |
| 3,452,593 | 7/1969 | Lauter, Jr. | 73/194 |
| 3,529,631 | 9/1970 | Riollet | 138/39 |
| 3,534,602 | 10/1970 | Boyd | 73/231 |
| 3,623,835 | 11/1971 | Boyd | 73/231 |
| 3,686,948 | 8/1972 | Lahaye | 73/230 |
| 3,757,578 | 9/1973 | Clinton | 73/231 R |
| 3,774,448 | 11/1973 | Gass et al. | 73/231 M |
| 3,823,310 | 7/1974 | Kalotay et al. | 235/151.34 |
| 3,945,253 | 3/1976 | Liu et al. | 73/231 R |
| 4,073,601 | 2/1978 | Kress | 416/242 |
| 4,114,440 | 9/1978 | Stapler | 73/231 R |
| 4,253,341 | 3/1981 | Ikeda et al. | 73/861 |
| 4,265,127 | 5/1981 | Onoda | 73/861 |

Primary Examiner—Herbert Goldstein

[57] ABSTRACT

Improved turbine comprising plural turbine blades supported by a turbine rotor of a flow meter, each turbine blade having a rounded leading edge, a feathered trailing edge, a concave top blade surface and a convex bottom blade surface, the turbine blade tapered from the leading edge to the trailing edge to form a hydrofoil shaped defined by empirical profile data.

6 Claims, 2 Drawing Sheets

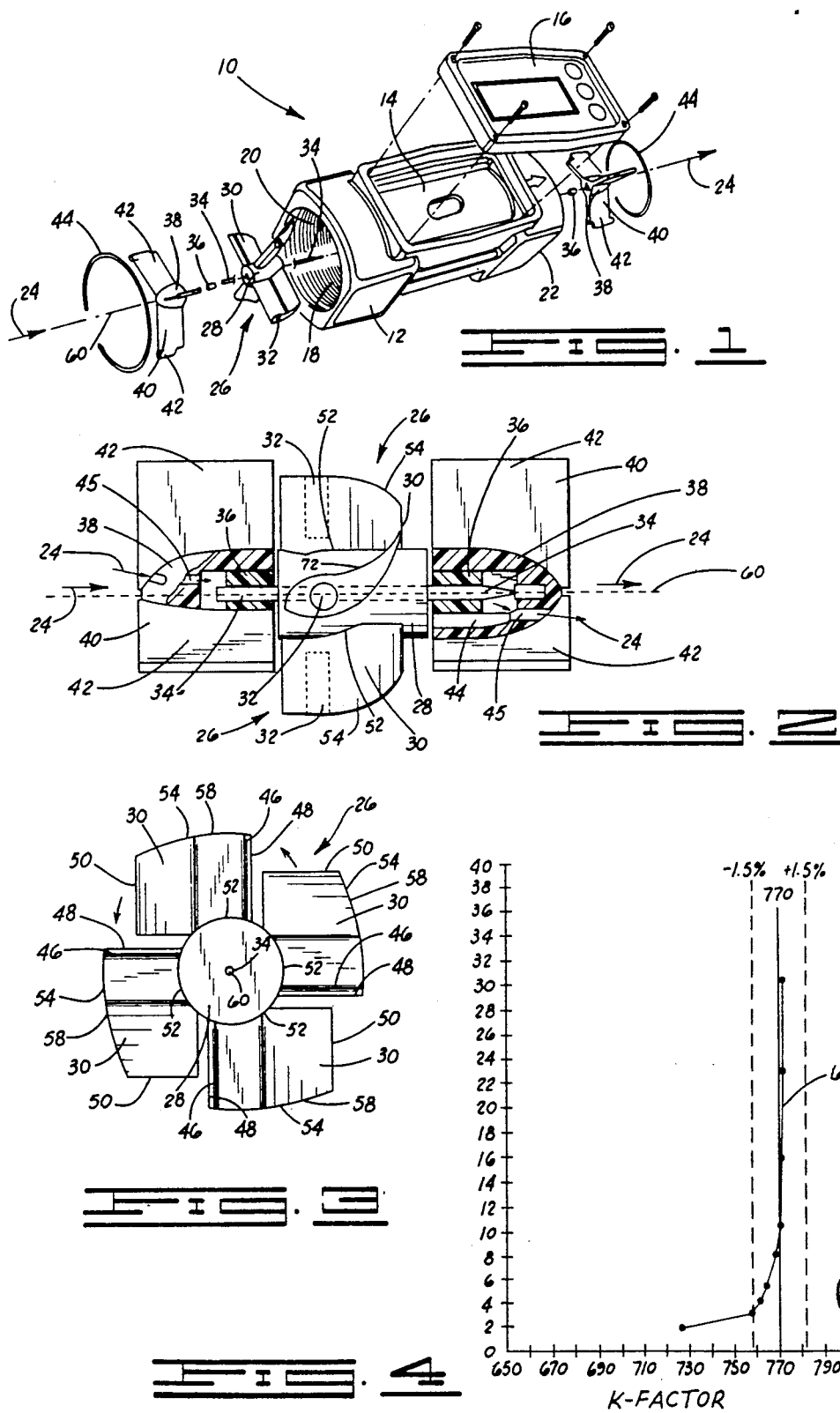

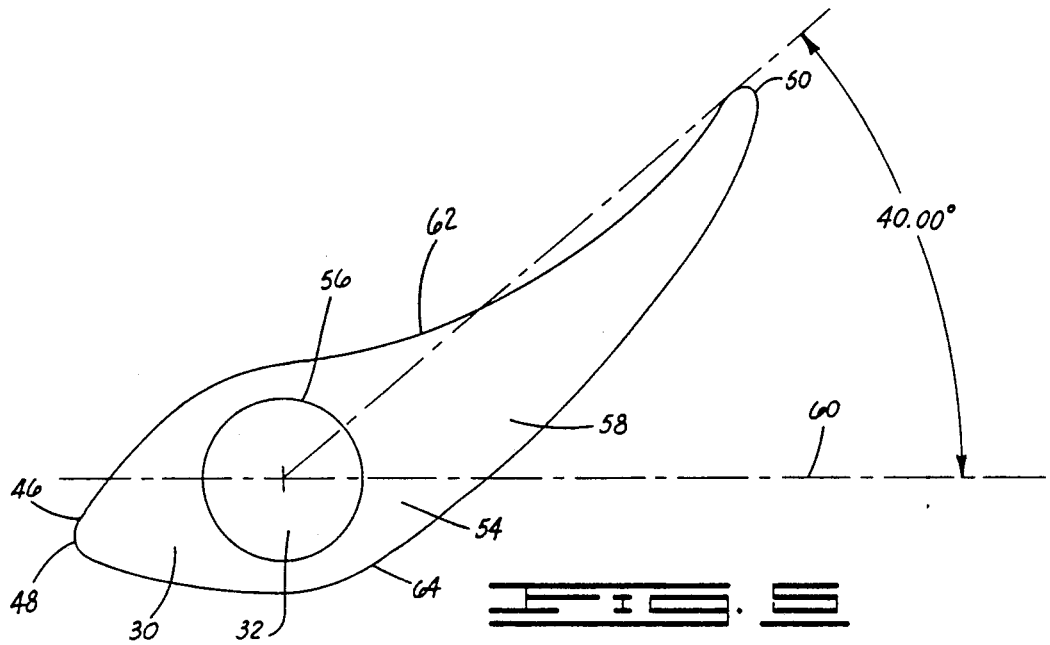
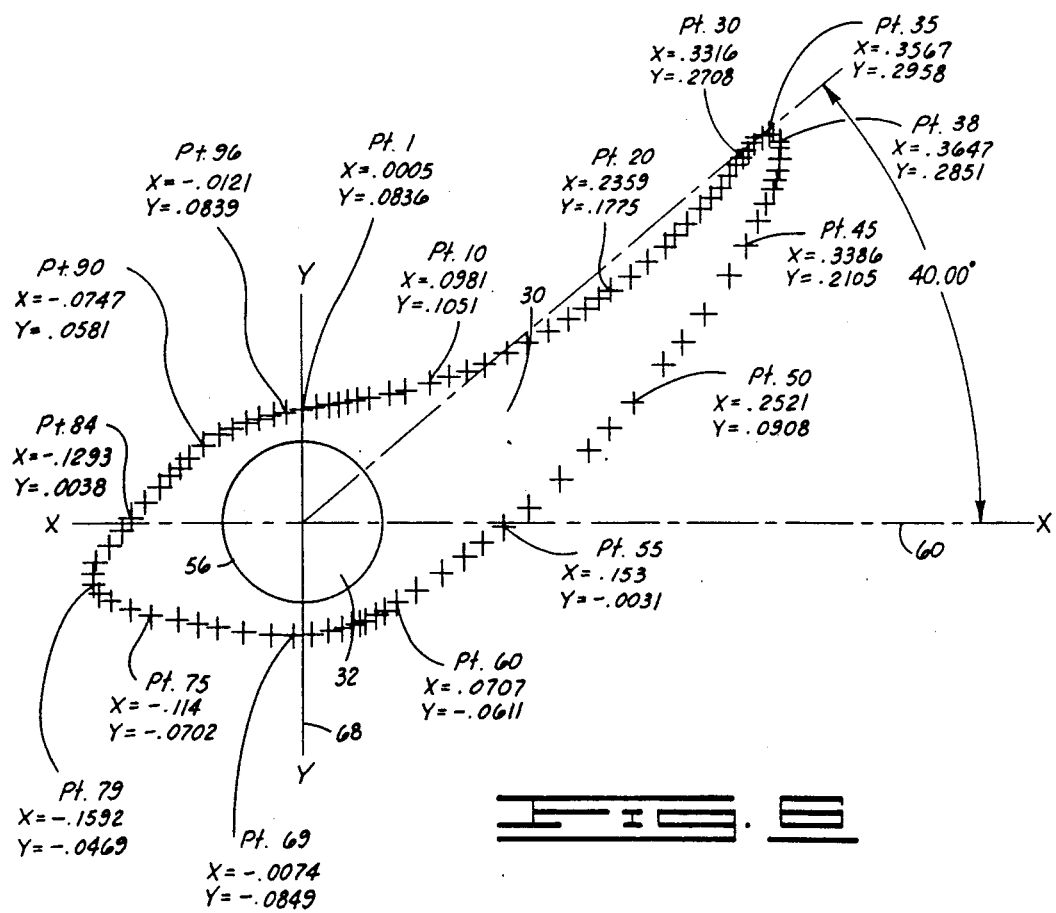

FLOW METER WITH IMPROVED TURBINE BLADES

This application is a Continuation-in-part to U.S. patent application Ser. No. 099,132, entitled FLOW METER TURBINE filed Sept. 21, 1987, now U.S. Pat. No. 4,856,348; which is a Continuation to U.S. patent application Ser. No. 826,297 entitled DIGITAL FLOW METER FOR DISPENSING FLUIDS filed Feb. 5, 1986, now U.S. Pat. No. 4,700,579; which is a Continuation-in-part to U.S. patent application Ser. No. 553,793 entitled DIGITAL FLOW METER FOR DISPENSING FLUIDS filed Nov. 21, 1983, now abandoned. These applications are incorporated by reference herein as necessary.

BACKGROUND OF THE INVENTION

1. Field of the Invention

The present invention relates generally to fluid flow measurement, and more particularly, but not by way of limitation, to turbine blade improvements for a flow meter.

2. Brief Description of the Prior Art

The size and complexity of fluid flow meters in the past have precluded the use of a flow meter which is disposed at the point of delivery where a fluid is dispensed. Further, flow meters with normal turbine blades used a flat blade profile of machined metal, which is expensive. Also, the high cost of existing self-contained battery powered equipment limited this type of equipment for use by an average consumer.

In the past there have been various types of flow meters with different types of read-out counters and blade designs. These types of flow meters are disclosed in the following U.S. Patents: Quesinberry U.S. Pat. No. 3,329,021; Belle U.S. Pat. No. 3,370,465; Gass et al U.S. Pat. No. 3,774,448; Kalotay, et al. U.S. Pat. No. 3,823,310; Onoda U.S. Pat. No. 4,265,127; Van Anden U.S. Pat. No. 128,338; Waugh U.S. Pat. No. 3,084,545; Potter U.S. Pat. No. 3,238,776; Clinton U.S. Pat. No. 3,757,578; Lauter, Jr. U.S. Pat. No. 3,452,593; Boyd U.S. Pat. No. 3,534,602; Lui et al. U.S. Pat. No. 3,945,253; and Ikeda et al. U.S. Pat. No. 4,253,341.

Boyd U.S. Pat. No. 3,623,835 teaches a magnetic flow meter which has a nonmagnetic housing with a passageway in which is positioned a turbine rotor. The turbine rotor has a pair of oppositely disposed vanes made of a nonmagnetic metal with magnetic plugs near the vane tips for inducing a signal in a detection coil.

The vanes of U.S. Pat. No. 3,623,835 are typically shaped with little regard to the flow dynamics of the vane profile. Adamtchik, U.S. Pat. No. 2,524,870, does teach a curved blade or vane on a screw wheel or the like. The Adamtchik rotor blade, termed an "aerofoil", has a profile which increases continuously from hub to tip for the purpose of reducing stress. And while others have considered flow efficiency of turbine blades, such as Riollet U.S. Pat. No. 3,529,631, such thought has largely been for the purpose of drag efficiency and not to measurement accuracy. Other prior art turbine blade designs are presented by Back, U.S. Pat. No. 1,719,415; Bristol et al., U.S. Pat. No. 3,332,500; Sparling, U.S. Pat. No. 2,770,131; Lahaye, U.S. Pat. No. 3,686,948; and Stapler, U.S. Pat. No. 4,114,440. Even the marine propeller of Kress, U.S. Pat. No. 4,073,601, when considered in the teachings of the other patents mentioned, does not provide any adequate teaching as to the desired blade profile for a flow meter which has a high measurement accuracy over a wide range of fluid flow and viscosity changes.

None of the patents mentioned hereinabove specifically discloses the unique structure and advantages of the improved turbine blade of the present invention used in a turbine flow meter.

SUMMARY OF THE INVENTION

The present invention provides an improved turbine having turbine blades mounted on a turbine rotor in spaced relationship to each other, the turbine rotatingly supported in a fluid opening of a flow meter housing mounted in a fluid delivery line for dispensing fluids. Each turbine blade has a flattened end, and in one embodiment, has an aperture in the flattened end in which is disposed a ferrous metal slug. Each turbine blade has a rounded leading edge and a feathered trailing edge with a concave top blade surface for receiving fluid flow thereagainst to rotate the turbine. The bottom surface of each turbine blade is convex in shape, and each blade is tapered from the rounded leading edge into the feathered trailing edge so as to form a hydrofoil shape.

One object of the present invention is to provide an improved turbine having turbine blades, the profile of each turbine blade insuring greater fluid measurement accuracy of fluid delivered through a flow meter, the design of the turbine blades empirically derived to determine a straight line constant "K" factor, over a wide range of flow rates.

Another object of the present invention is to eliminate the need for machining flat profile turbine blades, the turbine blades being moldable from a plastic material with the flat profile of the blades modified to provide for the mounting of ferrous metal slugs in the ends thereof.

Other objects, advantages and features of the present invention will become clear from the following detailed description of the preferred embodiment when read in conjunction with the drawings and the appended claims.

BRIEF DESCRIPTION OF THE DRAWINGS

FIG. 1 is a perspective view of a flow meter with a turbine and stationary shaft supports positioned for assembly in the meter.

FIG. 2 illustrates a partially cutaway side view of the turbine of FIG. 1 mounted on the stationary shaft supports.

FIG. 3 is a front view of the turbine of FIG. 1.

FIG. 4 is a plot of a "K" factor (pulses per unit measure) and flow rate (i.e. gpm).

FIG. 5 is an enlarged end view of the profile of the turbine blades of FIG. 1.

FIG. 6 is an enlarged end view of the blade profile of FIG. 5 plotted on a "X" and "Y" axis using computer aided design for obtaining an optimum profile for a near constant "K" factor.

DETAILED DESCRIPTION OF THE DRAWINGS

FIG. 1 shows a partially assembled flow meter designated by general reference numeral 10. The flow meter 10 includes a meter housing 12 having a display cavity 14 for receiving a liquid crystal display 16 with a digital counter incorporated therein. The counter is not shown in the drawing. The cavity 14 is also used for receiving electronic counter controls therein. The meter housing 12 further includes a fluid opening 18 therethrough with opposite ends 20 and 22 threaded for coupling a delivery line. The direction of fluid flow is indicated by arrows 24.

A turbine 26 is disposed inside the opening 18. The turbine 26 includes a turbine rotor 28 with a plurality of turbine blades 30 equally spaced around the turbine rotor 28 and extending outwardly therefrom. The turbine 26 is shown with four blades 30 attached to the rotor 28 at right angles to each other. Mounted in the ends of the blades 30 are ferrous metal slugs 32. The turbine 26 further includes a turbine shaft 34 extending therethrough and mounted on support bearings 36.

The support bearings 36 are received in a pair of support bases 38 which are a part of a pair of shaft supports 40. Each of the two shaft supports 40 includes a plurality of support arms 42 extending outwardly from the support base 38, the ends of the support arms 42 secured to the sides of the fluid opening 18 and held therein by split rings 44 received in opposite ends 20, 22 of the opening 18 in the meter housing 12.

In FIG. 2 the turbine 26 and shaft supports 40 are shown in a side view removed from the meter housing 12. The support bases 38 are partially cutaway to expose fluid ports 45 therethrough. The fluid ports 45 receive fluid, flowing in the direction of arrows 24, for acting as a washing and cooling agent around and beside the turbine shaft 34 and shaft bearings 36. An end profile of one of the turbine blades 30 with ferrous metal slug 32 is shown in FIG. 2. The unique profile features of the turbine blade 30 are discussed hereinbelow in greater detail.

As the turbine blades 30 of the turbine 26 rotate in the opening 18, the ferrous slugs 32 move adjacent the outer periphery of the opening 18 and past a pickup coil having a magnet mounted in the end thereof. The pickup coil and magnet are not shown in the drawings. The pickup coil converts the magnetic pulses received by the magnet to a readable electrical count which is sent to a microprocessor. The microprocessor is part of the liquid crystal display 16. The above-mentioned electrical controls are powered by batteries (not shown) disposed in the display cavity 14. The operation of the pickup coil, magnet and electrical controls of the flow meter 10 are discussed more fully in U.S. application Ser. No. 826,297 by the present inventor. This structure, while very important, is not part of the invention described herein.

Referring now to FIG. 3, which is a front view of the turbine 26 with turbine blades 30, and to FIG. 5, which is an enlarged end view of one of the turbine blades 30, it will be noted that each turbine blade 30 has a leading edge 46 with a rounded nose 48 tapering upwardly into a feathered trailing edge 50. Each blade 30 includes a first end 52 which is secured to the sides of the turbine rotor 26 and equally spaced therearound.

While four turbine blades 30 are shown in FIGS. 1, 2 and 3, it will be appreciated that any number of turbine blades 30 can be used consistent with the critical demands required in the accurate measurement of fluid flow through the flow meter 10. A second end 54 of each turbine blade 30 is flattened with an aperture or bore 56 therein for receiving the metal slug 32. The end of the slug 32 is flush with an outer edge or side 58 of the second end 54, and the side 58 is rounded as shown in FIG. 3 to correspond with the circumference of the fluid opening 18.

A centerline 60 is shown through the center of the fluid opening 18 and through the center of the turbine rotor 28. The centerline 60 is shown as a point in FIG. 3 and as the "X" axis in FIG. 6. A review of FIG. 3 and FIG. 5 will be reveal that the rounded nose 48 of the leading edge 46 is below the centerline 60 with the top of the nose 48 merging into a concave top blade surface 62. The concave top blade surface 62 flows upwardly into the feathered trailing edge 50. The bottom of the nose 48 flows slightly downward and then upwardly into a convex bottom blade surface 64. The concave top blade surface 62 is disposed above the centerline 60 and receives the force of fluid flowing in direction 24 to rotate the turbine 26. By positioning the rounded nose 48 below the centerline 60 the angle of attack of the turbine blade 30 in fluid engagement is improved. When viewing the turbine blade 30 in FIG. 2 and FIG. 5 it will be noted that it has a hydrofoil type shape with the concave top blade surface 62 and the convex bottom blade surface 64 tapered upwardly at an angle in the range of 40° a shown.

FIG. 4 illustrates how the unique shape and design of the turbine blades 30 influence the performance and accuracy of the amount of fluid delivered by the flow meter 10. It has been found that the shape of the turbine blades 30 directly influences the "K" factor (pulses per unit measure) over a certain flow range. The vertical ordinate in FIG. 4 depicts flow rate from 0 to 40 gallons per minute. Ideally the "K" factor should be a vertical line when plotting the "K" factor vs. flow rate. But on a practical basis, the "K" factor curve shown as line 66 is not a vertical line and has some slope to it; also, at the low end the line 66 has a "knee" shape.

From FIG. 4 it will be appreciated that once the flow meter 10 has started delivering fluid, and at a volume greater than 2 gallons per minute, the pulses per unit measured are plus and minus 1.5% accurate. In this example the pulses number approximately 770 per unit delivered. The straight line constant of the "K" factor helps insure accuracy in the amount of fluid delivered to a storage tank, through a pipeline and similar applications.

To obtain as near as possible a straight line constant for the "K" factor, the shape of turbine blade 30 was empirically derived through trial and error. Once bench testing was complete, computer aided design was used to determine the shape of the turbine blade 30. The result of such design is reflected in FIG. 6, with the centerline 60 being the "X" axis and a vertical line 68 being the "Y" axis. The "Y" axis is through the center of the metal slug 32 and the aperture 56. The intersection of the lines 60 and 68 act as the X=0 and Y=0 starting point.

The following table provides the profile data as shown in FIG. 6 for plotting the points about the cross-sectional envelope in the X and Y quadrants of the blade 30.

TABLE I

| Point | X | Y | Point | X | Y |
|---|---|---|---|---|---|
| 1 | .0005 | .0863 | 49 | .2759 | .1192 |
| 2 | .0114 | .0878 | 50 | .2521 | .0908 |
| 3 | .0206 | .0893 | 51 | .234 | .0717 |
| 4 | .0276 | .0898 | 52 | .2176 | .055 |
| 5 | .0341 | .0909 | 53 | .1965 | .0329 |
| 6 | .0418 | .0926 | 54 | .1721 | .0115 |
| 7 | .0512 | .094 | 55 | .153 | −.0031 |
| 8 | .0667 | .0969 | 56 | .136 | −.0155 |
| 9 | .0787 | .0994 | 57 | .1227 | −.0258 |

TABLE I-continued

| Point | X | Y | Point | X | Y |
|---|---|---|---|---|---|
| 10 | .0981 | .1051 | 58 | .1052 | −.038 |
| 11 | .1121 | .1097 | 59 | .0857 | −.0515 |
| 12 | .1262 | .1148 | 60 | .0707 | −.0611 |
| 13 | .1394 | .1199 | 61 | .0613 | −.0669 |
| 14 | .1567 | .1287 | 62 | .0546 | −.0703 |
| 15 | .1714 | .1361 | 63 | .0466 | −.074 |
| 16 | .1885 | .146 | 64 | .0419 | −.0759 |
| 17 | .2036 | .1549 | 65 | .0359 | −.078 |
| 18 | .2162 | .1631 | 66 | .0284 | −.0799 |
| 19 | .2272 | .1711 | 67 | .0176 | −.0819 |
| 20 | .2358 | .1775 | 68 | .0059 | −.0843 |
| 21 | .2505 | .1879 | 69 | −.0074 | −.0849 |
| 22 | .2634 | .1992 | 70 | −.0238 | −.0846 |
| 23 | .2776 | .2105 | 71 | −.0462 | −.0823 |
| 24 | .2848 | .218 | 72 | −.0649 | −.0789 |
| 25 | .2937 | .2271 | 73 | −.0795 | −.0767 |
| 26 | .3042 | .2378 | 74 | −.0942 | −.0738 |
| 27 | .3116 | .2455 | 75 | −.114 | −.0702 |
| 28 | .3193 | .254 | 76 | −.131 | −.0652 |
| 29 | .326 | .2629 | 77 | −.1457 | −.0594 |
| 30 | .3316 | .2708 | 78 | −.1543 | −.0535 |
| 31 | .336 | .2774 | 79 | −.1592 | −.0469 |
| 32 | .3392 | .2828 | 80 | −.1594 | −.039 |
| 33 | .3443 | .2889 | 81 | −.1564 | −.0306 |
| 34 | .3511 | .2938 | 82 | −.1462 | −.0174 |
| 35 | .3567 | .2958 | 83 | −.1369 | −.0054 |
| 36 | .3609 | .2947 | 84 | −.1293 | .0038 |
| 37 | .3636 | .2892 | 85 | −.1185 | .0152 |
| 38 | .3647 | .2851 | 86 | −.1078 | .027 |
| 39 | .3643 | .2762 | 87 | −.0998 | .0353 |
| 40 | .3627 | .2665 | 88 | −.0926 | .0412 |
| 41 | .3604 | .2596 | 89 | −.086 | .0479 |
| 42 | .3584 | .2525 | 90 | −.0747 | .0581 |
| 43 | .3534 | .2411 | 91 | −.0624 | .0659 |
| 44 | .3479 | .2291 | 92 | −.0525 | .0704 |
| 45 | .3386 | .2105 | 93 | −.0418 | .0751 |
| 46 | .3258 | .1886 | 94 | −.0328 | .0781 |
| 47 | .3071 | .1589 | 95 | −.0214 | .0815 |
| 48 | .2904 | .137 | 96 | −.0121 | .0839 |

In the upper right quadrant of FIG. 6, Points 1, 10, 20, 30, 35, 38, 45 and 50 are designated, respectively, outlining the upper concave top blade surface 62 and the convex bottom blade surface 64 tapered into the feathered trailing edge 50. The lower right quadrant designates points 55 and 60 making up a portion of the convex bottom blade surface 64 below the centerline 60. The lower left quadrant designates points 69, 75 and 79 making up a lower portion of the convex bottom blade surface 64 and the rounded hose 48 of the leading edge 46. The upper left quadrant designates points 84, 90 and 96 which help make up a line which is the round nose 48 merging into the concave top blade surface 62.

The turbine blade design can be described using typical aircraft wing terminology. The turbine blade 30 when viewed as shown in FIG. 5 is a thick subsonic, highly cambered airfoil with a relatively small leading edge radius. As mentioned above, the blade angle is in a range of 40° from the horizontal. The blade or airfoil also has a trailing edge radius as opposed to a sharp or pointed trailing edge. The concave top blade surface 62 acts as a positive-pressure area while the convex bottom blade surface 64 acts as a suction-negative pressure area. The camber line of the turbine blade 30 is displaced below the cord line and toward the convex bottom blade surface 64. When viewing the turbine blades 30 along the axis 60 as shown in FIG. 3, the blades 30 provide a high solidity ratio which is typical in the handling of fluids at subsonic speed.

As mentioned above, extensive testing of various blade designs was conducted with fluids of different viscosities. The unique profile of the blade 30 provided superior performance for a turbine used in a flow meter to accurately and consistently deliver and measure a desired fluid quantity.

The turbine 26 has been described hereinabove as having a plurality of turbine blades 30 which support ferrous metal slugs 32 disposed in the outer turbine blade ends. As mentioned, the purpose of the ferrous metal slugs 30 is to create magnetic pulses in a magnetic field which are sensed by a pickup coil. With the provision of the turbine blades 30, it will be appreciated that the turbine 26, including the turbine blades 30, can be constructed of any desirable material, such as a polymeric or plastic material that affords ease of molding. On the other hand, if the turbine 26 is made from a ferrous metal material, or a ferrous metal impregnated material, having sufficient magnetic field interaction, the slugs 32 can be omitted.

In most cases it will probably be desirable to use the slugs 32 as the source for field pulsing the magnetic field. The reason for this is the expense of machining the turbine 26 from an acceptable metal. Also, many applications requiring noncorrosive service will decree non-metallic material selection. It is believed, however, there will be applications which will best be served by turbines constructed in whole or in part of a ferrous containing metal such that the turbine blades 30 will not be required to practice the present invention.

It is clear that the present invention is well adapted to carry out the objects and to attain the ends and advantages mentioned herein as well as those inherent in the invention. While presently preferred embodiments of the invention have been described for the purposes of this disclosure, numerous changes may be made which will readily suggest themselves to those skilled in the art and which are encompassed within the spirit of the invention disclosed and as defined in the appended claims.

What is claimed is:

1. An improved turbine rotatingly supported in a fluid opening of a meter housing of a flow meter, the flow meter mounted in a fluid delivery line for dispensing fluids, the turbine comprising:
   a turbine rotor; and
   a plurality of turbine blades extending from the turbine rotor, each such turbine blade comprising:
      a first end attached to the turbine rotor with the turbine blade extending outwardly therefrom and a second end;
      a ferrous slug supported at the second end of the turbine blade;
      a rounded leading edge;
      a feathered trailing edge;
      a first blade surface concave in shape along the length of the blade, the concave first blade surface disposed to receive fluid flow thereagainst to rotate the turbine; and
      an opposed convex second blade surface tapered from the rounded leading edge into the feathered trailing edge so that the blade has a hydrofoil shape.

2. The turbine of claim 1 wherein the shape of each turbine blade is defined by the empirical data of Table I, such data incorporated by reference herein.

3. In a flow meter mounted in a fluid delivery line for dispensing fluids, the flow meter having a turbine with a turbine rotor having plural turbine blades extending therefrom and rotatably supported in a fluid opening of the flow meter, each turbine blade having a first end attached to the turbine rotor, the turbine blade extending outwardly therefrom and having an opposed second end, the improvement wherein each turbine blade comprises:

a leading edge with a rounded nose, the front of the nose extending downwardly from the end to end centerline of the turbine rotor;

a feathered trailing edge;

a first blade surface, the first blade surface concave in shape along the length of the blade, the concave first blade surface receiving the force of fluid flow thereagainst and driving the turbine; and a convex shaped opposed second blade surface such that the turbine blade is tapered from the rounded leading edge into the feathered trailing edge and the profile of the turbine blade has a hydrofoil shape defined by the empirical data of Table I, such data incorporated by reference herein.

4. The turbine blades of claim 3 wherein each turbine blade is made of a ferrous containing material.

5. The turbine blades of claim 3 wherein each turbine blade has a ferrous slug disposed at the second end thereof.

6. An improved turbine rotatingly supported in a fluid opening of a meter housing of a flow meter, the flow meter mounted in a fluid delivery line for dispensing fluids, the turbine comprising:

a turbine rotor; and a plurality of turbine blades extending from the turbine rotor, each such turbine blade comprising:

a first end attached to the turbine rotor with the turbine blade extending outwardly therefrom and a second end;

a ferrous slug supported at the second end of the turbine blade;

a rounded leading edge;

a feathered trailing edge;

a first blade surface concave in shape along the length of the blade, the concave first blade surface disposed to receive fluid flow thereagainst to rotate the turbine; and an opposed convex second blade surface tapered from the rounded leading edge into the feathered trailing edge so that the turbine blade has a hydrofoil shape defined by the empirical data of Table I, such data incorporated by reference herein.

* * * * *

UNITED STATES PATENT AND TRADEMARK OFFICE
CERTIFICATE OF CORRECTION

PATENT NO. : 5,046,370

DATED : September 10, 1991

INVENTOR(S) : Robert E. Hall

It is certified that error appears in the above-identified patent and that said Letters Patent is hereby corrected as shown below:

On the Title page

Assignee, delete "Industries" and substitute therefor --Industries,--;

After "Primary Examiner -- Herbert Goldstein" and before "Abstract"

insert -- Attorney Bill D.

Column 4, line 5, after "will" and before "reveal" delete "be"; and

Column 4, line 21, delete "a" and substitute therefor --as--.

Signed and Sealed this

Twenty-sixth Day of January, 1993

Attest:

STEPHEN G. KUNIN

*Attesting Officer*     *Acting Commissioner of Patents and Trademarks*